Figure 1:
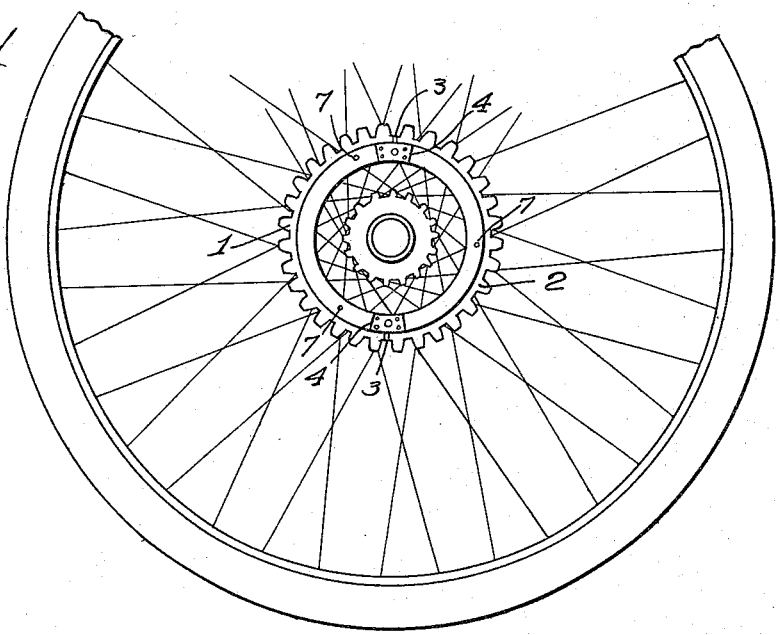

C. S. BURTON.
DRIVING GEAR.
APPLICATION FILED DEC. 8, 1913.

1,147,303.

Patented July 20, 1915.

Witnesses

Inventor.
Charles S. Burton,
by Burton & Burton
his Attys.

UNITED STATES PATENT OFFICE.

CHARLES S. BURTON, OF OAK PARK, ILLINOIS, ASSIGNOR TO STEWART-WARNER SPEED-OMETER CORPORATION, OF CHICAGO, ILLINOIS, A CORPORATION OF VIRGINIA.

DRIVING-GEAR.

1,147,303.

Specification of Letters Patent. Patented July 20, 1915.

Application filed December 8, 1913. Serial No. 805,245.

*To all whom it may concern:*

Be it known that I, CHARLES S. BURTON, a citizen of the United States, residing at Oak Park, in the county of Cook and State of Illinois, have invented new and useful Improvements in Driving-Gears, of which the following is a specification, reference being had to the accompanying drawings, forming a part thereof.

The purpose of this invention is to provide an improved speedometer driving gear for use on motorcycles and other vehicles.

It consists in the features and elements described and shown in the drawings as indicated by the claims.

Figure 2:
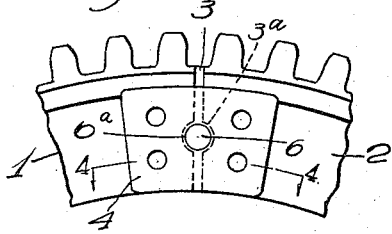
Figure 3:
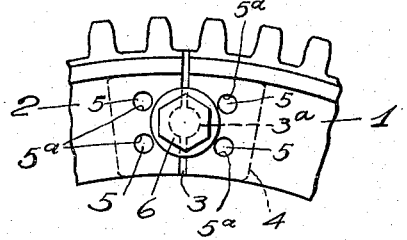
Figure 4:
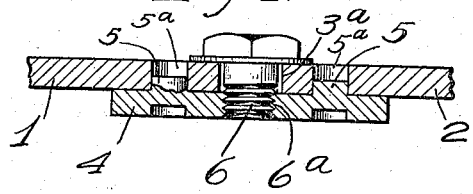

In the drawings, Figure 1 is an elevation of a motorcycle wheel equipped with a gear which is the subject of this invention. Fig. 2 is a front view of a portion of the gear. Fig. 3 is a rear view of a portion of the gear. Fig. 4 is a section taken as indicated at line 4—4 on Fig. 2.

The gear which is to be described consists of a metal ring which is split into two portions, 1 and 2, by sawing it through at 3, or preferably, by sawing it partway through and then breaking it so that the roughened edges will fit snugly into one another, and will keep the space between the teeth where the cut is made the same as the space between the other teeth of the gear. A splicing plate, 4, provides the means by which the two portions, 1 and 2, of the gear are joined together. This plate, 4, has projecting from it four bosses, 5, which fit firmly into corresponding holes, 5ª, drilled through the ring, two on either side of the sawcut, 3. These bosses, 5, may be conveniently formed by punching the metal of the plate, 4, partway through, as shown in Fig. 4. For holding the plate, 4, against the face of the gear so that the bosses, 5, may serve to couple the two portions of the ring securely there is provided a clamping bolt, 6, which screws into a threaded aperture, 4ª, in the splicing plate. The shank of the bolt, 6, is accommodated in an aperture, 3ª, formed in the gear at the line of the sawcut, 3. This construction permits the gear to be very easily separated for encircling the axle of the wheel to which it is to be fixed, and very readily assembled by the insertion of the two clamping bolts, 6, 6. For securing the gear to the spokes of the wheel any well known fastening means may be used, being arranged as indicated at 7, on Fig. 1.

I claim:—

1. A gear comprising separable sections, a splicing plate adapted for connecting said sections and having a plurality of lugs projecting from one face, the gear sections having apertures positioned to receive said lugs at least two of which are disposed at one side of the line of separation of the sections, and means for holding the plate against the gear sections with its lugs engaged in said apertures.

2. A gear comprising separable sections, a splicing plate adapted for connecting said sections and having a plurality of lugs projecting from one face, the gear sections having apertures positioned to receive said lugs at least two of which are disposed at one side of the line of separation of the sections, and a clamping bolt for holding said plate against the gear sections, said sections having an aperture to accommodate said bolt at their line of separation with a portion of said aperture extending into each section.

3. A gear comprising separable sections, a splicing plate adapted for connecting said sections and having a plurality of lugs projecting from one face, the gear sections having apertures positioned to receive said lugs at least two of which are disposed at one side of the line of separation of the sections, and a bolt for holding the plate against the gear sections, with said lugs engaged in said apertures, said plate being threaded to receive the bolt.

4. A gear comprising separable sections, a splicing plate adapted for connecting said sections and having a plurality of lugs projecting from one face, the gear sections having apertures positioned to receive said lugs at least two of which are disposed at one side of the line of separation of the sections, and a clamping bolt for holding said plate against the gear sections, an aperture being formed through the gear to accommodate said bolt disposed to extend into the plane of separation of the gear sections.

5. A gear comprising separable sections, a splicing plate adapted for connecting said sections and having a plurality of lugs struck out from one face of the plate and integral therewith, the gear sections having apertures positioned to receive said lugs at least two of which are disposed at one side of the line of separation of the sections, and means for holding the plate against the gear sections with its lugs engaged in said apertures.

In testimony whereof witness my hand at Chicago, Illinois, this 2nd day of December, 1913.

CHARLES S. BURTON.

Witnesses:
ROBT. N. BURTON,
EDNA M. MACINTOSH.

Copies of this patent may be obtained for five cents each, by addressing the "Commissioner of Patents, Washington, D. C."